United States Patent
Spaur et al.

(10) Patent No.: US 8,189,285 B1
(45) Date of Patent: *May 29, 2012

(54) METHOD AND SYSTEM FOR AUTOMATIC TIME BASE ADJUSTMENT FOR DISK DRIVE SERVO CONTROLLERS

(75) Inventors: Michael R. Spaur, Irvine, CA (US); Raymond A. Sandoval, Aliso Viejo, CA (US)

(73) Assignee: Marvell International Ltd., Hamilton (BM)

(*) Notice: Subject to any disclaimer, the term of this patent is extended or adjusted under 35 U.S.C. 154(b) by 172 days.

This patent is subject to a terminal disclaimer.

(21) Appl. No.: 12/361,121

(22) Filed: Jan. 28, 2009

Related U.S. Application Data

(63) Continuation of application No. 10/384,992, filed on Mar. 10, 2003, now Pat. No. 7,492,545.

(51) Int. Cl.
*G11B 20/20* (2006.01)
(52) U.S. Cl. ............ 360/76; 360/31; 360/51; 360/75; 360/77.02
(58) Field of Classification Search .................. None
See application file for complete search history.

(56) References Cited

U.S. PATENT DOCUMENTS

| | | |
|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle |
| 4,144,583 A | 3/1979 | Lawson et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,486,827 A | 12/1984 | Shima et al. |
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner* — Dismery Mercedes

(57) ABSTRACT

A servo controller includes a first device that determines an adjusted servo-to-servo skew value. A servo field timer increments a timer value between consecutive servo fields, receives the adjusted servo-to-servo skew value, and adjusts an incremented timer value between the consecutive servo fields based on the adjusted servo-to-servo skew value.

15 Claims, 8 Drawing Sheets

U.S. PATENT DOCUMENTS

| | | | |
|---|---|---|---|
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley |
| 5,088,093 A | 2/1992 | Storch et al. |
| 5,109,500 A | 4/1992 | Isek et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Wemg |
| 5,146,585 A | 9/1992 | Smith, III |
| 5,157,669 A | 10/1992 | Yu et al. |
| 5,162,954 A | 11/1992 | Miller et al. |
| 5,179,704 A | 1/1993 | Jibbe et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama |
| 5,280,488 A | 1/1994 | Glover et al. |
| 5,285,327 A | 2/1994 | Hetzler |
| 5,285,451 A | 2/1994 | Henson |
| 5,301,333 A | 4/1994 | Lee |
| 5,307,216 A | 4/1994 | Cook et al. |
| 5,315,456 A * | 5/1994 | Hessing et al. ............ 360/77.08 |
| 5,315,708 A | 5/1994 | Eidler et al. |
| 5,317,713 A | 5/1994 | Glassburn |
| 5,329,630 A | 7/1994 | Baldwin |
| 5,339,443 A | 8/1994 | Lockwood |
| 5,349,667 A | 9/1994 | Kaneko |
| 5,361,266 A | 11/1994 | Kodama et al. |
| 5,361,267 A | 11/1994 | Goaiwala et al. |
| 5,375,248 A | 12/1994 | Lemay et al. |
| 5,408,644 A | 4/1995 | Schneider |
| 5,408,673 A | 4/1995 | Childers et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson |
| 5,487,170 A | 1/1996 | Bass |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt |
| 5,507,005 A | 4/1996 | Kojima |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen |
| 5,557,764 A | 9/1996 | Stewart et al. |
| 5,563,896 A | 10/1996 | Nakaguchi |
| 5,568,606 A | 10/1996 | Dobbek |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato |
| 5,590,380 A | 12/1996 | Yamada et al. |
| 5,592,404 A | 1/1997 | Zook |
| 5,600,662 A | 2/1997 | Zook et al. |
| 5,602,857 A | 2/1997 | Zook et al. |
| 5,603,035 A | 2/1997 | Erramoun et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,659,759 A | 8/1997 | Yamada |
| 5,664,121 A | 9/1997 | Cerauskis |
| 5,689,656 A | 11/1997 | Baden |
| 5,691,994 A | 11/1997 | Acosta |
| 5,692,135 A | 11/1997 | Alvarez |
| 5,692,165 A | 11/1997 | Jeddeloh et al. |
| 5,719,516 A | 2/1998 | Sharpe-Geisler |
| 5,729,511 A | 3/1998 | Schell et al. |
| 5,729,718 A | 3/1998 | Au |
| 5,734,848 A | 3/1998 | Gates et al. |
| 5,740,466 A | 4/1998 | Geldman |
| 5,745,793 A | 4/1998 | Atsatt et al. |
| 5,754,759 A | 5/1998 | Clarke et al. |
| 5,758,188 A | 5/1998 | Appelbaum et al. |
| 5,768,044 A | 6/1998 | Hetzler et al. |
| 5,784,569 A | 7/1998 | Miller |
| 5,787,483 A | 7/1998 | Jam et al. |
| 5,794,073 A | 8/1998 | Ramakrishnan |
| 5,801,998 A | 9/1998 | Choi |
| 5,805,370 A * | 9/1998 | Lee ................................. 360/61 |
| 5,818,886 A | 10/1998 | Castle |
| 5,822,142 A | 10/1998 | Hicken |
| 5,826,093 A | 10/1998 | Assouad et al. |
| 5,831,922 A | 11/1998 | Choi |
| 5,835,299 A * | 11/1998 | Lee et al. ........................ 360/76 |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,928,367 A | 7/1999 | Nelson et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,021,458 A | 2/2000 | Jayakumar et al. |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri |
| 6,067,206 A * | 5/2000 | Hull et al. .................. 360/77.08 |
| 6,070,200 A | 5/2000 | Gates et al. |
| 6,078,447 A | 6/2000 | Sim |
| 6,081,397 A * | 6/2000 | Belser ............................. 360/51 |
| 6,081,849 A | 6/2000 | Born et al. |
| 6,081,867 A | 6/2000 | Cox |
| 6,092,231 A | 7/2000 | Sze |
| 6,094,320 A | 7/2000 | Ahn |
| 6,105,119 A | 8/2000 | Kerr et al. |
| 6,108,150 A | 8/2000 | Lee |
| 6,115,778 A | 9/2000 | Miyake et al. |
| 6,124,994 A | 9/2000 | Malone, Sr. |
| 6,128,153 A * | 10/2000 | Hasegawa et al. .......... 360/77.08 |
| 6,134,063 A | 10/2000 | Weston-Lewis et al. |
| 6,134,676 A | 10/2000 | VanHuben et al. |
| 6,157,984 A | 12/2000 | Fisher |
| 6,178,486 B1 | 1/2001 | Gill |
| 6,192,499 B1 | 2/2001 | Yang |
| 6,201,655 B1 | 3/2001 | Watanabe et al. |

| | | |
|---|---|---|
| 6,223,303 B1 | 4/2001 | Billings et al. |
| 6,279,089 B1 | 8/2001 | Schibilla et al. |
| 6,285,632 B1 | 9/2001 | Ueki |
| 6,297,926 B1 * | 10/2001 | Ahn ............................ 360/77.04 |
| 6,314,480 B1 | 11/2001 | Nemazie et al. |
| 6,330,626 B1 | 12/2001 | Dennin et al. |
| 6,381,659 B2 | 4/2002 | Proch et al. |
| 6,401,149 B1 | 6/2002 | Dennin et al. |
| 6,401,154 B1 | 6/2002 | Chiu et al. |
| 6,421,760 B1 | 7/2002 | McDonald et al. |
| 6,470,461 B1 | 10/2002 | Pinvidic et al. |
| 6,487,631 B2 * | 11/2002 | Dickinson et al. ............ 711/112 |
| 6,490,635 B1 | 12/2002 | Holmes |
| 6,493,171 B2 * | 12/2002 | Enokida et al. ................. 360/75 |
| 6,496,517 B1 | 12/2002 | Gehman et al. |
| 6,515,813 B2 * | 2/2003 | Kitazaki et al. ................. 360/51 |
| 6,526,476 B2 | 2/2003 | Wilson et al. |
| 6,530,000 B1 | 3/2003 | Krantz et al. |
| 6,574,676 B1 | 6/2003 | Megiddo |
| 6,574,699 B1 * | 6/2003 | Dobbek ............................ 711/4 |
| 6,583,943 B2 * | 6/2003 | Malone, Sr. ..................... 360/48 |
| 6,594,721 B1 | 7/2003 | Sakarda et al. |
| 6,618,780 B1 | 9/2003 | Popat |
| 6,629,204 B2 | 9/2003 | Tanaka et al. |
| 6,651,126 B1 | 11/2003 | Cantrell et al. |
| 6,662,253 B1 | 12/2003 | Gary et al. |
| 6,662,313 B1 | 12/2003 | Swanson et al. |
| 6,662,334 B1 | 12/2003 | Stenfort |
| 6,693,462 B1 | 2/2004 | Wang et al. |
| 6,694,398 B1 | 2/2004 | Zhao et al. |
| 6,711,643 B2 | 3/2004 | Park et al. |
| 6,714,373 B1 | 3/2004 | Sasaki |
| 6,721,828 B2 | 4/2004 | Verinsky et al. |
| 6,728,054 B2 * | 4/2004 | Chng et al. ...................... 360/63 |
| 6,728,814 B2 | 4/2004 | Leinen |
| 6,742,060 B2 | 5/2004 | Poisner et al. |
| 6,742,065 B1 | 5/2004 | Suh |
| 6,765,736 B2 | 7/2004 | Ko et al. |
| 6,765,744 B2 | 7/2004 | Gomez et al. |
| 6,772,258 B2 | 8/2004 | Poisner et al. |
| 6,807,595 B2 | 10/2004 | Khan et al. |
| 6,826,650 B1 | 11/2004 | Krantz |
| 6,842,819 B2 | 1/2005 | Smith et al. |
| 6,880,030 B2 | 4/2005 | Brenner et al. |
| 6,895,500 B1 | 5/2005 | Rothberg |
| 6,915,416 B2 | 7/2005 | Deng et al. |
| 6,917,997 B2 | 7/2005 | Bhagat |
| 6,924,953 B2 | 8/2005 | Fish et al. |
| 6,944,703 B2 | 9/2005 | Okaue et al. |
| 6,947,233 B2 | 9/2005 | Toda |
| 6,950,258 B2 * | 9/2005 | Takaishi ........................... 360/51 |
| 6,952,749 B2 | 10/2005 | Kim |
| 6,963,462 B2 * | 11/2005 | Satoh .............................. 360/63 |
| 6,976,155 B2 | 12/2005 | Drysdale et al. |
| 7,039,771 B1 | 5/2006 | Spaur et al. |
| 7,054,236 B2 | 5/2006 | Kawano |
| 7,064,915 B1 | 6/2006 | Spaur et al. |
| 7,080,188 B2 | 7/2006 | Byers et al. |
| 7,099,963 B2 | 8/2006 | Byers et al. |
| 7,219,182 B2 | 5/2007 | Robeck et al. |
| 7,457,903 B2 | 11/2008 | Purdham et al. |
| 7,529,051 B2 * | 5/2009 | Hanson et al. .................. 360/51 |
| 2001/0043424 A1 * | 11/2001 | Nguyen ........................... 360/75 |
| 2002/0080698 A1 | 6/2002 | Turner et al. |
| 2002/0087773 A1 | 7/2002 | Poisner et al. |
| 2002/0087931 A1 | 7/2002 | Jaber |
| 2002/0120815 A1 | 8/2002 | Zahavi et al. |
| 2002/0124132 A1 | 9/2002 | Haines et al. |
| 2002/0149868 A1 * | 10/2002 | Nakasato ......................... 360/51 |
| 2002/0199076 A1 | 12/2002 | Fujii |
| 2003/0081479 A1 | 5/2003 | Matsumoto et al. |
| 2003/0204655 A1 | 10/2003 | Schmisseur et al. |
| 2004/0019831 A1 | 1/2004 | Gergen et al. |
| 2004/0093538 A1 | 5/2004 | Hester et al. |
| 2004/0199695 A1 | 10/2004 | Purdham et al. |
| 2006/0129704 A1 | 6/2006 | Byers et al. |
| 2007/0226392 A1 | 9/2007 | Byers et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1988 |
| WO | WO 2004081738 | 9/2004 |

OTHER PUBLICATIONS

PCT search report for PCT/US00/07780 mailed Oct. 2, 2000, 4 pages.

PCT search report for PCT/US01/22404 mailed Jan. 29, 2003, 4 pages.

"Memory and Peripheral Interface," Chapter 5—LH77790A/B User's Guide (Version 1.0) pp. 5-1 to 5-35.

PCT International Search Report, Doc. No. PCT/US2004/007119, Dated Aug. 25, 2005.

PCI Local Bus Specification, Revision 2.1, Jun. 1, 1995, pp. 9-12, 21-23, 33-42, 108-109, 235-243.

Structure Computer Organization, 3$^{rd}$ Edition, by Andrew S. Tanenbaum, pp. 11-13.

"Embedded Risc Microcontroller Core ARM7TDMI". Revision 0673CS-11/99. Atmel Corporation.

Blathut R.; "Digital Transmission of Information"; Dec. 4, 1990; pp. 429-430.

Hwang, Kai and Briggs, Fay A., "Computer Architecture and Parallel Processing"; Mar. 1984, McGraw-Hill College; pp. 156-164.

Zeidman, Bob; "Interleaving DRAMS for faster access"; System Design ASIC & EDA; Nov. 1993; pp. 24-34.

P.M. Bland et al.; "Shared Storage Bus Circuitry"; IBM Technical Disclosure Bulletin, vol. 25, No. 4,; Sep. 1982; pp. 2223-2224.

Information Technology; "Small Computer System Interface—2 (SCSI-2)"; Revision 10L; Sep. 7, 1993; pp. 31-46, 91-93, 104-108, 118, 135, 161, and 223.

* cited by examiner

METHOD AND SYSTEM FOR AUTOMATIC TIME BASE ADJUSTMENT FOR DISK DRIVE SERVO CONTROLLERS

CROSS REFERENCE TO RELATED APPLICATIONS

This application is a continuation of U.S. patent application Ser. No. 10/384,992 filed Mar. 10, 2003. The disclosure of the above application is incorporated herein by reference in its entirety.

This is application is related to the following U.S. patent applications, filed on even date herewith and incorporated herein by reference in their entirety: "METHOD AND SYSTEM FOR SUPPORTING MULTIPLE EXTERNAL SERIAL PORT DEVICES USING A SERIAL PORT CONTROLLER IN EMBEDDED DISK CONTROLLERS", U.S. patent application Ser. No. 10/385,039 (now U.S. Pat. No. 7,039,771), filed Mar. 10, 2003, with Michael Spaur and Ihn Kim as inventors.

"METHOD AND SYSTEM FOR EMBEDDED DISK CONTROLLERS", U.S. patent application Ser. No. 10/385,022 (now U.S. Pat. No. 7,080,188), filed Mar. 10, 2003, with Larry L. Byers, Paul B. Ricci, Joesph G. Kriscunas, Joseba M. Desubijana, Gary R. Robeck Michael R. Spaur and David M. Purdham, as inventors.

"METHOD AND SYSTEM FOR USING AN EXTERNAL BUS CONTROLLER IN EMBEDDED DISK CONTROLLERS" U.S. patent application Ser. No. 10/385,056 (now U.S. Pat. No. 7,219,182), filed Mar. 10, 2003, with Gary R. Robeck, Larry L. Byers, Joseba M. Desubijana, and Fredarico E. Dutton as inventors.

"METHOD AND SYSTEM FOR USING AN INTERRUPT CONTROLLER IN EMBEDDED DISK CONTROLLERS", U.S. application Ser. No. 10/384,991 (now U.S. Pat. No. 7,457,903), filed Mar. 10, 2003, with David M. Purdham, Larry L. Byers and Andrew Artz as inventors.

"METHOD AND SYSTEM FOR MONITORING EMBEDDED DISK CONTROLLER COMPONENTS", U.S. patent application Ser. No. 10/385,042 (now U.S. Pat. No. 7,099,963), filed Mar. 10, 2003, with Larry L. Byers, Joseba M. Desubijana, Gary R. Robeck, and William W. Dennin as inventors.

"METHOD AND SYSTEM FOR COLLECTING SERVO FIELD DATA FROM PROGRAMMABLE DEVICES IN EMBEDDED DISK CONTROLLERS", U.S. patent application Ser. No. 10/385,405 (now U.S. Pat. No. 7,064,915), filed Mar. 10, 2003, with Michael R. Spaur and Raymond A. Sandoval as inventors.

BACKGROUND OF THE INVENTION

1. Field of the Invention

The present invention relates generally to storage systems, and more particularly to disk drive servo controllers.

2. Background

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk (or platter) typically has a number of concentric rings or tracks (platter) on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding with a read or writes operation. Data is accessed serially, one bit at a time and typically, each disk has its own read/write head.

FIG. 1A shows a disk drive system 100 with platters 101A and 101B, an actuator 102 and read/write head 103. Typically, multiple platters/read and write heads are used (see FIG. 1C, heads 108-111). Platters 101A-101B have assigned tracks for storing system information, servo data and user data.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

To access data from a disk drive (or to write data), the host system must know where to read (or write data to) the data from the disk drive. A driver typically performs this task. Once the disk drive address is known, the address is translated to cylinder, head and sector based on platter geometry and sent to the disk controller. Logic on the hard disk looks at the number of cylinders requested. Servo controller firmware instructs motor control hardware to move read/write heads 103 to the appropriate track. When the head is in the correct position, it reads the data from the correct track.

Typically, read and write head 103 has a write core for writing data in a data region, and a read core for magnetically detecting the data written in the data region of a track and a servo pattern recorded on a servo region.

A servo system 104 detects the position of head 103 on platter 101A according to a phase of a servo pattern detected by the read core of head 103. Servo system 104 then moves head 103 to the target position.

Servo system 104 servo-controls head 103 while receiving feedback for a detected position obtained from a servo pattern so that any positional error between the detected position and the target position is negated.

Typically, servo data is stored on the same surface that stores user data to provide the signals for operating servo system 104. FIG. 1B shows how servo data may be located on a disk platter. Region 106 that stores servo data is typically interspersed between user-data regions 105. Each user-data region 105 has user-data track segments, and each servo-data region 106 has servo-data track segments. The servo data includes track-identification data used during track-seeking operations, and burst data used during track-following operations.

Recorded servo information is shifted (or skewed) from one head to the next. This is referred to as "staggered embedded servo fields". FIG. 1C shows an example of staggered servo fields ("SF") for a two-platter system using four heads (108-111) on tracks 108A-111A, respectively. It is noteworthy that Heads 108-111 is similar to head 103 and throughout the specification are used interchangeably. For example, SF DATA 106,106A, 106C and 106E are staggered with respect to each other, as head change occurs from 108 over track 108A to head 111 over track 111A.

Typically, servo information is coded at the time a disk is manufactured. During disk manufacturing, all servo fields have a controlled time based relationship from one platter surface to another surface. However, due to shock, vibration, thermal expansion, contraction, or any other factors, the angular distance as specified in the servo fields varies from one surface to another. Because the angular distance varies, the amount of time that elapses between the servo fields also varies. During head change (for example, from head 108 to 109), servo field timer must be adjusted to control proper capture of servo data to control head position when the selected head for reading transitions from one platter surface to another.

Conventional techniques, only during disk calibration, require the servo processor to measure skew between each heads, record actual skew in a table and when head 103 change occurs, adjust the servo timer by the appropriate amount.

This technique has disadvantages. For example, during calibration, servo processor resources are used for measuring and recording the values. In addition, the amount of time required by the servo processor to record and recall skew during calibration is not constant. Hence, conventional techniques are not desirable to adjust the time base based on recorded/recalled skew servo information.

Therefore, what is desired is an efficient and accurate system for time adjusting based on real time and measured, skew values.

SUMMARY OF THE INVENTION

In one aspect of the present invention, a servo controller (SC) system used in an embedded disk controller is provided. The system includes, a servo timing controller, wherein the servo timing controller includes a first register that stores measured servo skew values at a given time; a first set of registers that receive stored skew values and the measured skew values; and logic that adjusts the skew values based on the measured skew values measured by a reference timer.

In another aspect of the present invention, a method for adjusting stored servo skew values based on measured skew values is provided. The process includes, measuring actual skew values during a head change in a read operation; comparing the measured skew values with the stored skew values; adjusting the skew value based on the comparison; and adjusting a servo field timer based on the adjusted skew value.

In one aspect of the present invention, time adjustment is based on actual measured values, rather than estimates. This is accurate, real-time, and hence desirable in today's high-end storage systems.

In another aspect of the present invention, measured values may be stored and used to update the estimated skew values stored during manufacturing.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of an embedded disk controller will be described initially. The specific architecture and operation of the preferred embodiment will then be described.

Figure 2:
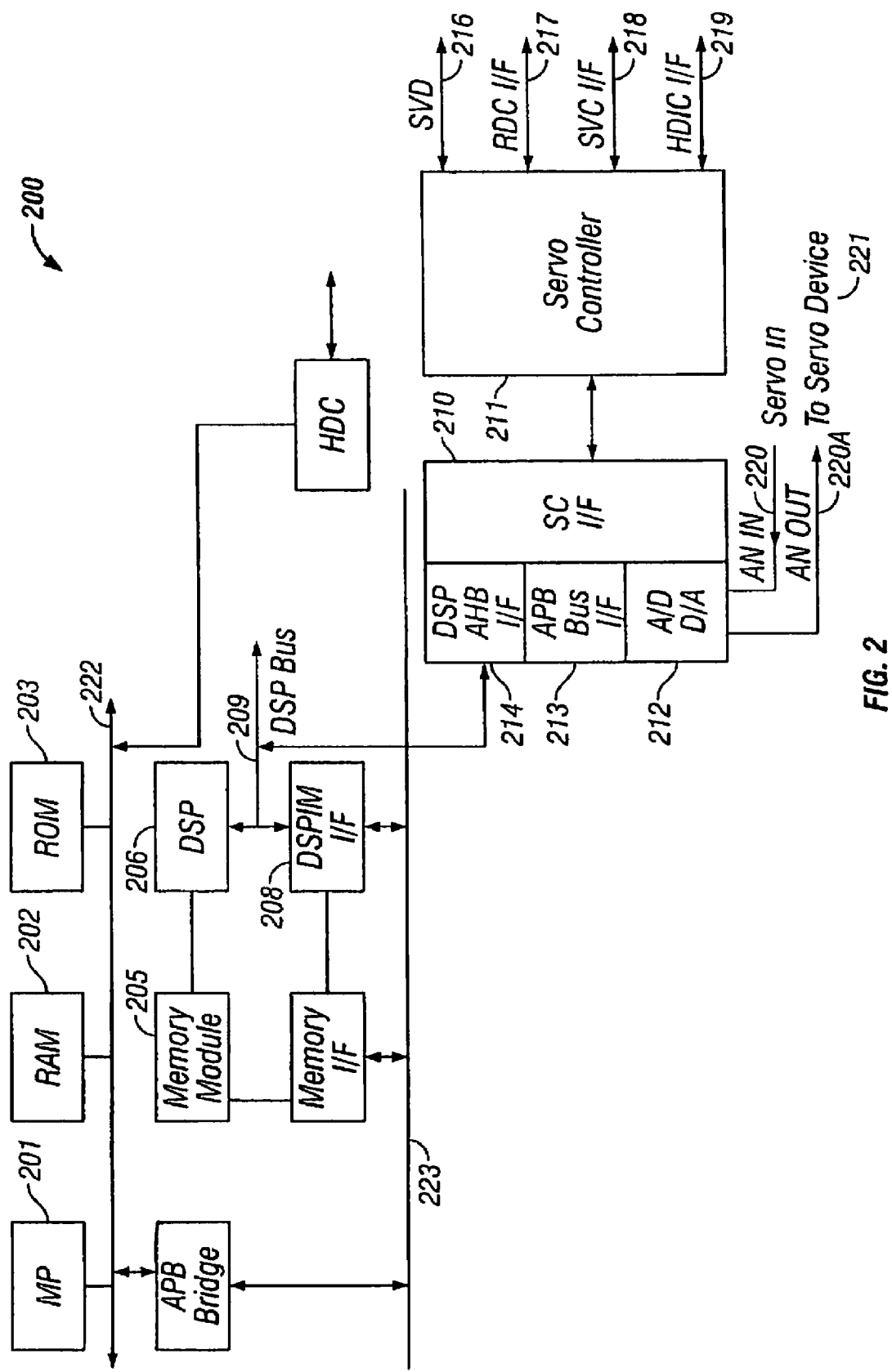
FIG. 2 is a block diagram of an embedded disk controller system, according to one aspect of the present invention.

FIG. 2 shows a block diagram of an embedded disk controller system 200 according to one aspect of the present invention. System 200 may be an application specific integrated circuit ("ASIC").

System 200 includes a microprocessor ("MP") 201 that performs various functions described below. MP 201 may be a Pentium® Class processor designed and developed by Intel Corporation® or an ARM processor. MP 201 is operationally coupled to various system 200 components via buses 222 and 223. Bus 222 may be an Advance High performance (AHB) bus as specified by ARM Inc. Bus 223 may an Advance Peripheral Bus ("APB") as specified by ARM Inc. The specifications for AHB and APB are incorporated herein by reference in their entirety.

System 200 is also provided with a random access memory (RAM) or static RAM (SRAM) 202 that stores programs and instructions, which allows MP 201 to execute computer instructions. MP 201 may execute code instructions (also referred to as "firmware") out of RAM 202.

System 200 is also provided with read only memory (ROM) 203 that stores invariant instructions, including basic input/output instructions.

200 is also provided with a digital signal processor ("DSP") 206 that controls and monitors various servo functions through DSP interface module ("DSPIM") 208 and servo controller interface 210 operationally coupled to a servo controller ("SC") 211.

208 interfaces DSP 206 with MP 201 and allows DSP 206 to update a tightly coupled memory module (TCM) 205 (also referred to as "memory module" 205) with servo related information. MP 201 can access TCM 205 via DSPIM 208.

Servo controller interface ("SCI") 210 includes an APB interface 213 that allows SCI 210 to interface with APB bus 223 and allows SC 211 to interface with MP 201 and DSP 206.

SCI 210 also includes DSPAHB interface 214 that allows access to DSPAHB bus 209. SCI 210 is provided with an analog to digital and a digital to analog converter 212 that converts data from analog to digital domain and vice-versa. Analog data 220 enters module 212 and leaves as analog data 220A to a servo drive 221.

SC 211 has a read channel device (RDC) serial port 217, a motor control ("SVC") serial port 218 for a "combo" motor controller device, a head integrated circuit (HDIC) serial port 219 and a servo data ("SVD") interface 216 for communicating with various devices.

Figure 3:
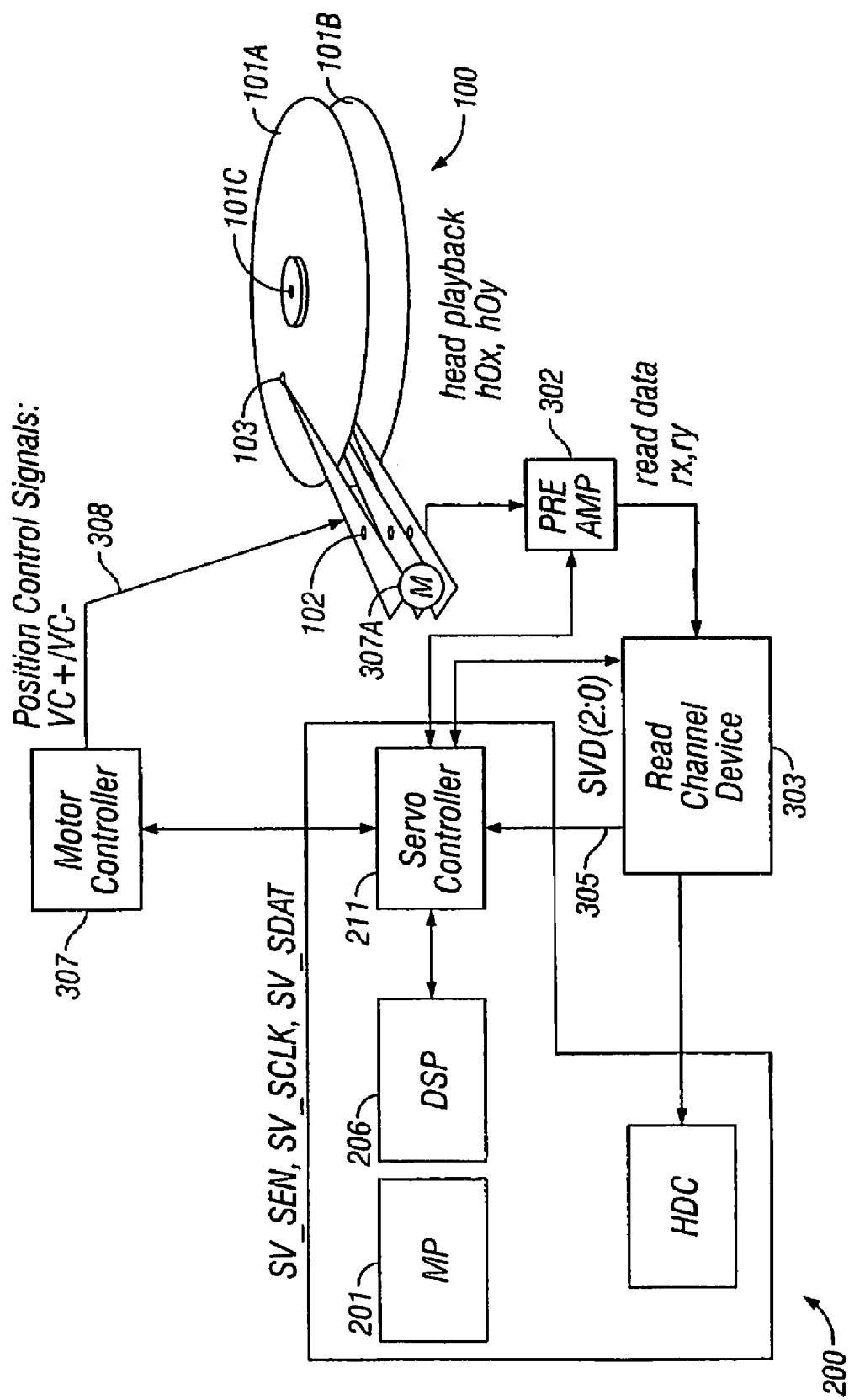
FIG. 3 is a block diagram showing the various components of the FIG. 3 system and a two-platter, four-head disk drive, according to one aspect of the present invention.

FIG. 3 shows a block diagram with disk 100 coupled to system 200, according to one aspect of the present invention. FIG. 3 shows a read channel device 303 that receives signals from a pre-amplifier 302 (also referred to as a Head Integrated Circuit ("HDIC")) coupled to disk 100. One example of a read channel device 303 is manufactured by Marvell Semiconductor Inc.®, Part Number 88C7500, while pre-amplifier 302 may be a Texas instrument, Part Number SR1790. Servo data ("SVD") 305 is sent to SC 211 and processed, as discussed below.

A motor controller 307, (for example, a motor controller manufactured by Texas Instruments®, Part Number SH6764) sends control signals 308 to control actuator movement using motor 307A. It is noteworthy that spindle 101C is controlled by a spindle motor (not shown) for rotating platters 101A and 101B. SC 211 transmits certain control commands to motor controller 307. An example is provided, SV_SEN (enables motor controller 307), SV_SCLK (clock signal) and SV_S-DAT (servo data).

Figure 4:
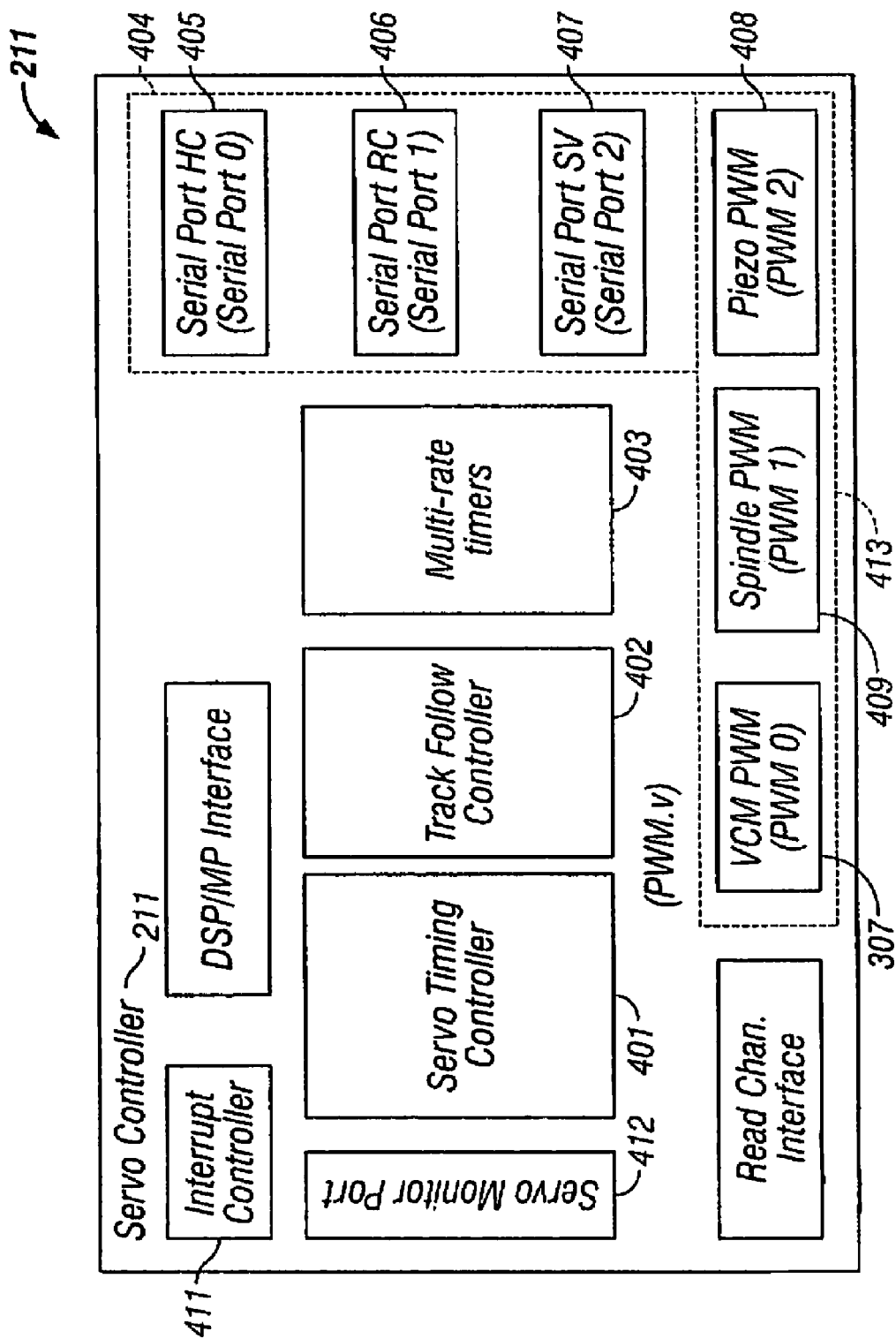
FIG. 4 is a block diagram of a servo controller, according to one aspect of the present invention.

FIG. 4 shows a block diagram of SC 211, according to one aspect of the present invention. FIG. 4 shows a servo timing controller ("STC") 401 that automatically adjusts the time base when a head change occurs, according to one aspect of the present invention, as discussed below.

Servo controller 211 includes an interrupt controller 411 that can generate an interrupt to DSP 206 and MP 201. Interrupts may be generated when a servo field is found (or not found) and for other reasons.

SC 211 includes a servo monitoring port 412 that monitors various signals to SC 211.

Once STC 401 completes the start sequence, track follow controller 402 may be used to track head position and perform the correction calculations to control head position.

SC 211 also uses multi rate timer 403 that allows correction of position multiple times per servo data sample. This allows data to move from DSP 206 to motor controller 307.

SC 211 uses a pulse width modulation unit ("PWM") 413 for supporting control of motor 307A PWM, and a spindle motor PWM 409 and a piezo PWM 408.

SC 211 also has a serial port controller 404 for controlling various serial ports 405-407.

MP 201 and DSP 206 use read channel device 303 for transferring configuration data and operational commands through SC 211 (via read channel serial port interface 406, FIG. 4).

Figure 1A:
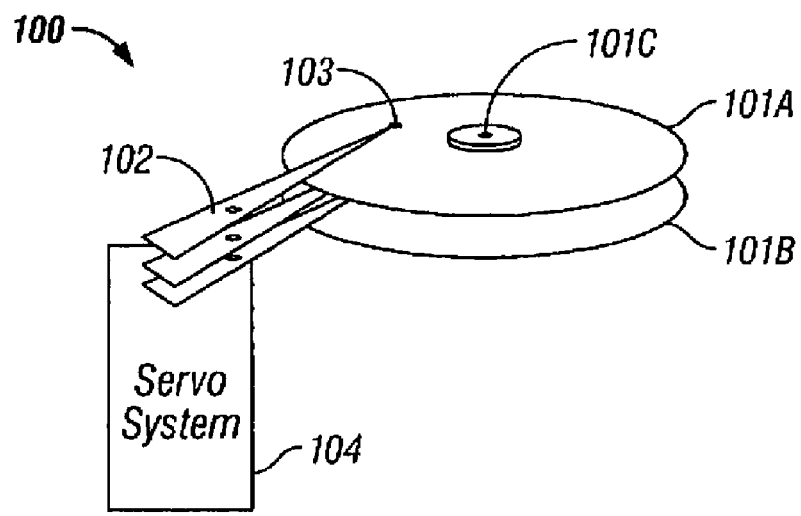
FIG. 1A shows a block diagram of a disk drive.
Figure 1B:
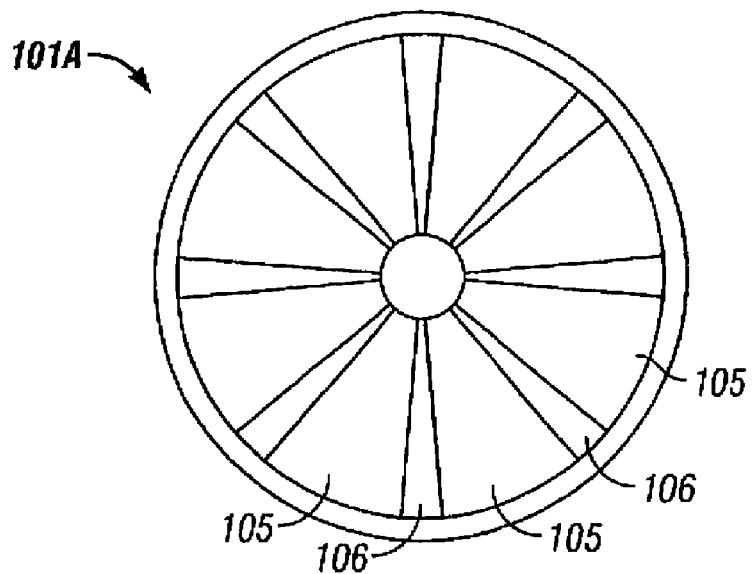
FIG. 1B shows an example of how servo data is recorded on a disk platter.
Figure 1C:
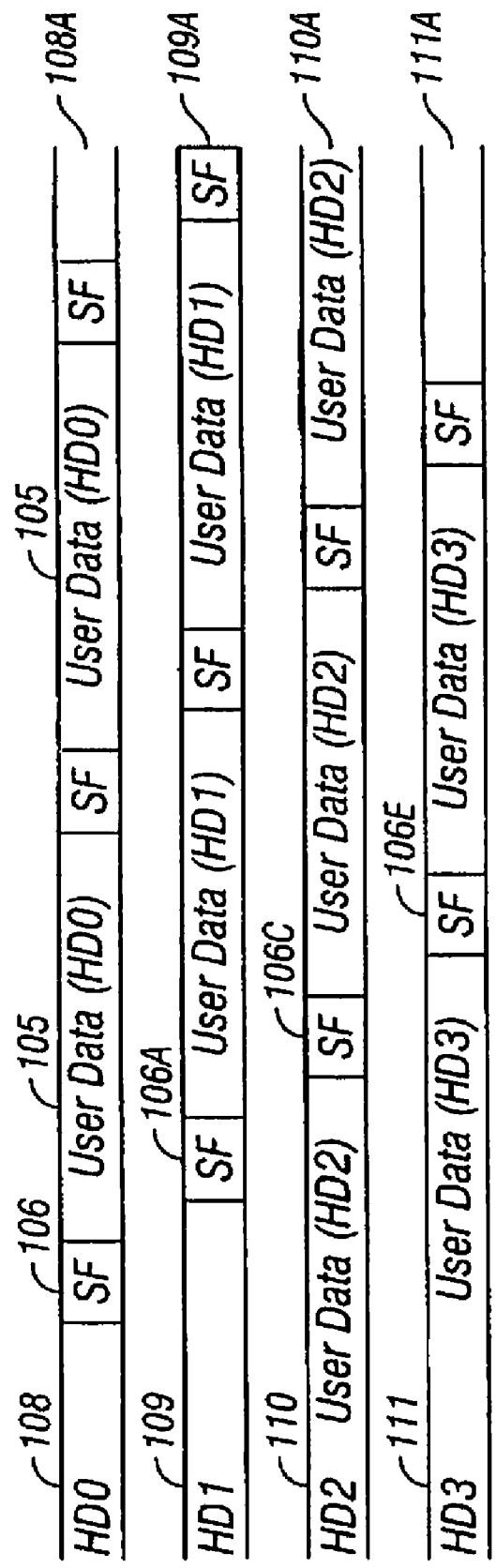
FIG. 1C shows an example of embedded staggered servo fields, used according to one aspect of the present invention.
Figure 5:
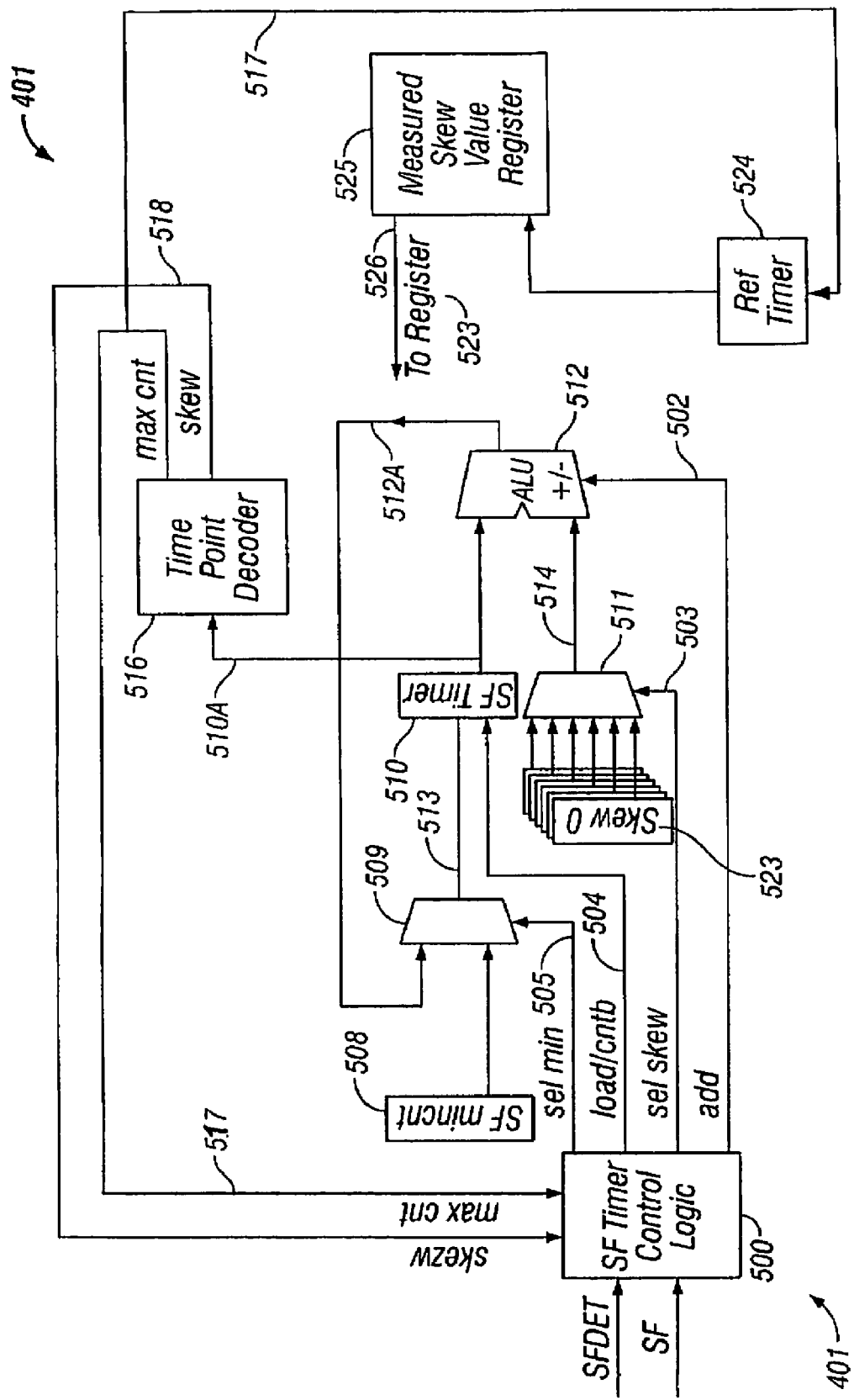
FIG. 5 is a schematic of a servo timing controller, according to one aspect of the present invention.

FIG. 5 shows a detailed block diagram of STC 401. STC 401 includes a skew timer register 525 that stores measured skew values when a head change occurs, for example, from head 108 to 109, as shown in FIG. 1C. At servo detection, timer control logic 500 captures the value of reference timer 524 in skew value register 525. Firmware retrieves register 525 contents and transfers the same to register 523 for adjusting skew and the associated time base. In one aspect, register 525 may have six actual measured skew values to accommodate various head movements in a four-head, two-platter system (See FIG. 1C).

Measured skew values 526 are sent to a set of register 523 and are used for the time base adjustment, in one aspect of the present invention. Registers 523 send measured skew values 514 to multiplexor ("Mux") 511 when timer control logic 500 sends a sel_skew signal 503 to logic 511. Signal 503 is sent to Mux 511 that generates the amount of skew 514 and sends that value to logic 512. In one aspect, logic 512 may be an arithmetic logic unit.

Logic 512 also receives signal 502 from SF timer control logic 500. Signal 502 instructs logic 512 whether to add or subtract the amount of skew from the recorded skew values. Based on signal 502, logic 512 generates the adjusted skew value 512A, which is then sent to Mux 509 that also receives a reset value from register 508. Mux 509 generates the adjusted value 513 and sends it to SF timer 510. SF timer 510 then generates the adjusted time base value 510A, which is sent to a decoder 516. Based on signal 510A, a skew/time adjustment signal 518 is generated. Signal 510A provides the current time base for the entire system of FIG. 5.

It is noteworthy that signal 512A may be sent directly to SF timer 510 instead of register 508.

SF timer 510 may be adjusted at any particular time by specific amounts.

Signal 505 is used to control Mux 509, while signal 504 is used to control SF timer 510.

Signals 517 (max_cnt) indicates the time to reset reference timer 524.

SF timer 510 is used to control the generation of signal 518 that provides the pointer to one of the skew adjustment values. In addition, Signal 518 indicates the time to use one of the skew values (in register 523).

Figure 6:
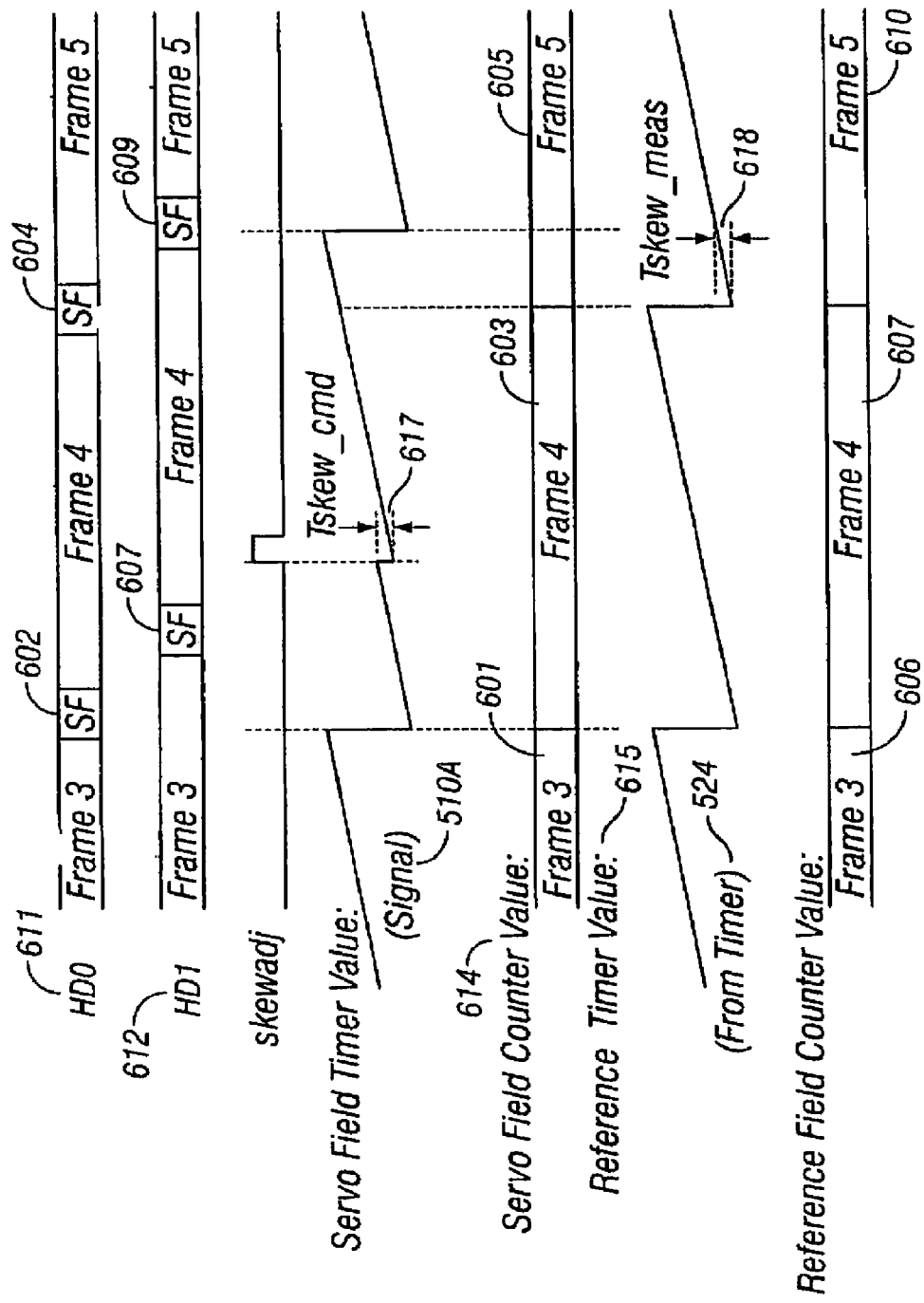
FIG. 6 is a timing diagram using the servo timing controller, according to one aspect of the present invention.

FIG. 6 graphically illustrates the foregoing adaptive aspects of the present invention of adjusting skew based on real-time measured values. FIG. 6 shows two heads 611 and 612 (similar to heads 108-111) with staggered servo fields 602, 607, 604 and 609. Original servo field adjustment values (as set during manufacturing and stored in register set 523) are not shown. FIG. 6 shows the estimated skew adjustment 617 when head change occurs from 611 to 612.

Servo field counter value 614 is stored in a servo field counter register (not shown) located in STC 401.

Reference timer 524 value 615 is not adjusted for skew. Skew measurement 618 is based on actual measured skew value, while data is being read from a platter after a head change occurs.

Figure 7:
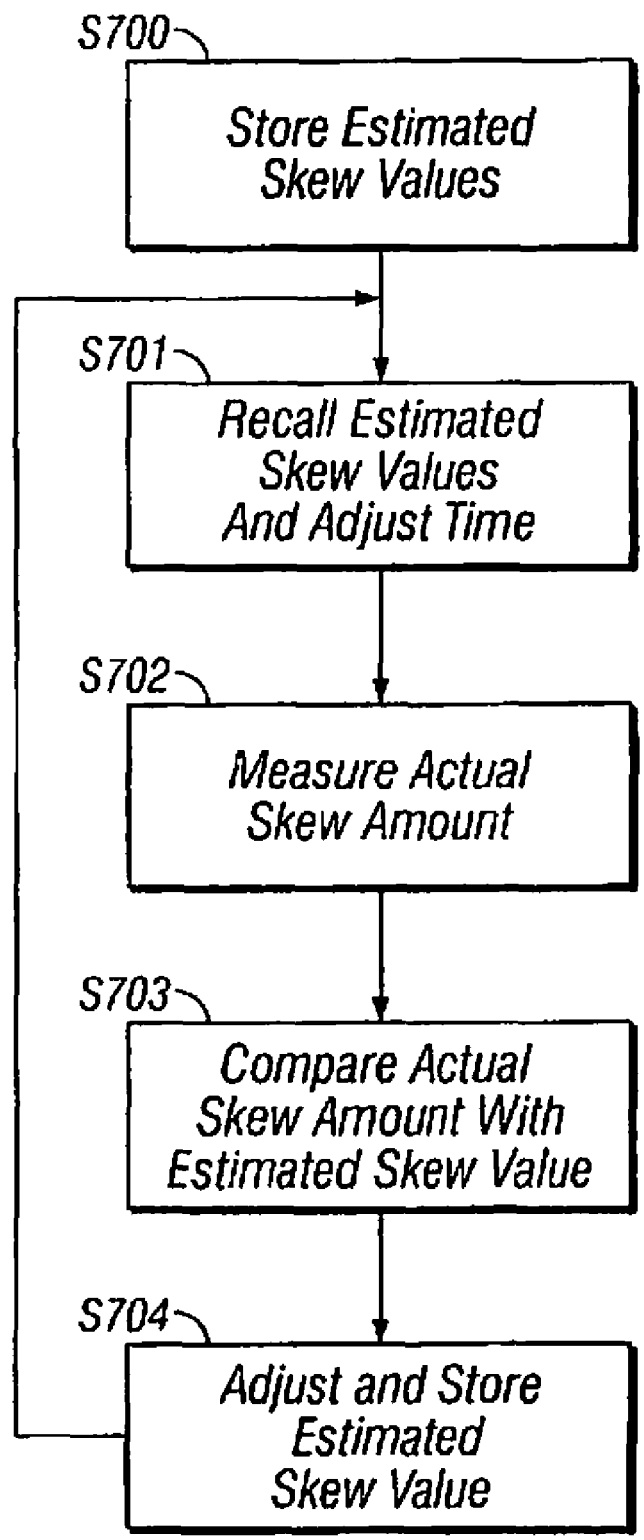
FIG. 7 is a flow diagram of a process for adjusting time base based on measured skew values, according to one aspect of the present invention.

FIG. 7 shows a flow diagram of executable-process steps for adjusting SF timer based on real-time measured skew values.

In step S700, the process stores the skew values. This is done during manufacturing of the disk drive.

In step S701, the estimated skew values (either manufacturing values or adjusted previously, at any given time) are recalled from register 523 and used to adjust timer 510. This adjustment is based on the output of logic 512 and register 523 values.

In step S702, the actual skew is measured after a head change. Reference timer 524 measures the actual skew. Measured skew values are loaded into registers 523. This may be performed by system firmware.

In step S703, the measured skew value is compared to the stored skew values in step S701. This task is performed by DSP 206.

In step S704, skew values are adjusted based on the comparison. The adjusted value is then sent to register 523 for future use. The process then moves back to step S701 and the loop continues. Hence, the estimated skew values are adjusted real time based on the measured values.

In one aspect of the present invention, SF timer 510 controls skew adjustment based on actual measured values, rather than estimates. This is accurate, real-time, and hence desirable in today's high-end storage systems.

In another aspect of the present invention, measured values may be stored and used to update the estimated skew values stored during manufacturing.

Although the present invention has been described with reference to specific embodiments, these embodiments are illustrative only and not limiting. Many other applications and embodiments of the present invention will be apparent in light of this disclosure and the following claims.

What is claimed is:

1. A servo controller comprising:
    a first device that determines an adjusted servo-to-servo skew value; and
    a servo field timer that
        increments a timer value between consecutive servo fields,
        receives the adjusted servo-to-servo skew value, and
        adjusts an incremented timer value between the consecutive servo fields based on the adjusted servo-to-servo skew value.

2. The servo controller of claim 1, wherein the first device:
    receives a selected one of prior servo-to-servo skew values and measured servo-to-servo skew values;
    receives an adjustment value; and
    determines the adjusted servo-to-servo skew value based on:
        the selected one of the prior servo-to-servo skew values and the measured servo-to-servo skew values; and
        the adjustment value.

3. The servo controller of claim 2, further comprising:
    a measuring device that determines the measured servo-to-servo skew values; and
    memory that stores the prior servo-to-servo skew values and the measured servo-to-servo skew values.

4. The servo controller of claim 3, wherein the measuring device includes a reference timer that measures actual servo-to-servo skew values to determine the measured servo-to-servo skew values.

5. The servo controller of claim 4, wherein the measuring device determines the measured servo-to-servo skew values when a head change occurs during a read operation of a storage device.

6. The servo controller of claim 3, wherein the memory includes:
    a first register that stores the measured servo-to-servo skew values; and
    at least one second register that stores the prior servo-to-servo skew values.

7. The servo controller of claim 1, wherein the first device includes at least one of a decoder and an arithmetic first unit.

8. An embedded disk controller that includes the servo controller of claim 1.

9. A method for operating a servo controller, the method comprising:
    determining an adjusted servo-to-servo skew value;
    incrementing a timer value between consecutive servo fields; and
    adjusting an incremented timer value between the consecutive servo fields based on the adjusted servo-to-servo skew value.

10. The method of claim 9, further comprising:
    receiving a selected one of prior servo-to-servo skew values and measured servo-to-servo skew values;
    receiving an adjustment value; and
    determining the adjusted servo-to-servo skew value based on:
        the selected one the selected one of the prior servo-to-servo skew values and the measured servo-to-servo skew values; and
        the adjustment value.

11. The method of claim 10, further comprising:
    determining the measured servo-to-servo skew values; and
    storing the prior servo-to-servo skew values and the measured servo-to-servo skew values.

12. The method of claim 11, further comprising measuring actual servo-to-servo skew values with a reference timer to determine the measured servo-to-servo skew values.

13. The method of claim 12, further comprising determining the measured servo-to-servo skew values when a head change occurs during a read operation of a storage device.

14. The method of claim 11, wherein storing the prior servo-to-servo skew values and the measured servo-to-servo skew values includes storing the measured servo-to-servo skew values in a first register and storing the prior servo-to-servo skew values in at least one second register.

15. The method of claim 9, wherein determining an adjusted servo-to-servo skew value includes determining the adjusted servo-to-servo skew value with at least one of a decoder and an arithmetic first unit.

* * * * *